United States Patent Office 3,108,874
Patented Oct. 29, 1963

3,108,874
PROCESS FOR TREATING CHOCOLATE AND THE RESULTING PRODUCT
Robert R. Baldwin, Briarcliff Manor, John R. Lowry, White Plains, Joseph F. Mezzino, Garnerville, and William J. Ohan, Jr., New City, N.Y., assignors to General Foods Corporation, White Plains, N.Y., a corporation of Delaware
No Drawing. Filed May 18, 1959, Ser. No. 813,628
14 Claims. (Cl. 99—23)

This invention relates to a method of treating chocolate products. More specifically, it relates to a technique for treating chocolate products to reduce the bloom and to increase storage life thereof.

As is well known to those skilled-in-the-art, chocolate products are prepared from cocoa beans. More specifically, the cocoa bean is harvested and dried; the dried bean is then broken up into nibs. These nibs are separated from shell and other undesirable materials which may be present. The separated nibs may then be roasted at elevated temperature to give roasted nibs which are subsequently milled (i.e. pressed between rollers) to give a chocolate liquor. This liquor may be molded as such to form baking chocolate or it may be mixed with other ingredients including sugar, etc., to form coatings or any one of a wide variety of well-known products.

Chocolate has only a moderate storage life or shelf life. Chocolate products, typically baking chocolate, when stored at ambient temperature conditions, and in particular under conditions wherein the temperature regularly fluctuates, may have an all-too-brief storage life. More specifically, it is found that chocolate which has been stored becomes characterized by a light color, a plurality of pock-like marks, an apparent dehydration, and a powdery nature. In particular in the advanced stages the surface may contain small areas termed rosettes which clearly indicate that the chocolate has changed. In common parlance, all of these changes and others are characterized by the word "bloom." Although a chocolate which has bloomed may not necessarily be inedible or inferior or even bacteriologically undesirable, chocolate which has bloomed is generally regarded by the consumer as being defective and/or deficient even though there is no basis for this, other than appearance. Accordingly every effort is made by chocolate manufacturers and fabricators to prepare chocolate products which are and which remain completely free of bloom.

When a chocolate product has bloomed, it is visually quite apparent what has happened. Although it is not completely certain what the internal or chemical changes were when chocolate blooms, it appears that there may be certain changes in the internal crystal and chemical structure of the components of the chocolate. More specifically, it appears that various chemical groupings forming the chemical components of the chocolate may shift from one chemical molecule to another to form different chemical compounds which possess new crystal structures or melting points which are different from the crystal structures or melting points of the original materials.

In order to minimize these defects of prior art chocolate products, it has been common to subject them to tempering, and typically tempered chocolate possesses a much lower bloom than does untempered chocolate. By a lower bloom is meant essentially a longer shelf life. Commonly, tempering of cocoa liquors is effected by heating, with continuous stirring, to about 130° F. The so-heated chocolate is then slowly cooled to about 87° F. at which point it may be held for an extended period of time, typically 3 hours. In commercial operations, the time of tempering may be as long as 48 hours or even longer. At this temperature, which is the seeding point, crystals of fat start to form. After the 3 hour holding or tempering period, the liquid is cooled to 60° F., and then poured into molds wheren it solidifies.

Tempering chocolate in this manner (or by other techniques) permits attainment of a chocolate product having a storage life of approximately 5–6 months under constant room temperature conditions below the melting point of the product.

Among the various techniques which may be employed to determine the bloom resistance or shelf life of a chocolate product is a cycling test which essentially comprises placing the tempered chocolate product under conditions which accelerate bloom. More specifically, the cycling test may include maintaining the sample at 90° F. for a minimum of 2 hours and typically about 15 hours and then maintaining the same sample at a lowered temperature of about 60° F. for a minimum of 2 hours and typically about 15 hours. This basic cycle may be repeated until bloom appears.

The most satisfactory prior art chocolate product when tested in accordance with this cycling test may be found to have bloomed after about 3 cycles. This corresponds to a storage life of about 5–6 months under the more-or-less standard conditions. Such a shelf life is generally regarded as unsatisfactory in that many chocolate products might be stored e.g. in plants, in warehouses, in retail outlets, or in the home for periods of time considerably longer. In fact if, during normal commercial handling of the chocolate product, it is not properly stored (or if vigorous cycling occurs), its shelf life may be considerably less, down to a minimum of even a few days.

It is an object of this invention to provide a novel chocolate product characterized by an increased resistance to bloom under even the most unfavorable conditions and by an increased shelf life. Another object of this invention is to provide a technique for attaining such an improved chocolate product. Other objects will be apparent to those skilled-in-the-art on inspection of the following description.

In accordance with certain aspects of this invention, it is possible to prepare a chocolate product characterized by a decreased tendency to bloom and an increased storage life by the process which comprises treating chocolate liquor with ionizing penetrating radiation.

The raw materials which may be treated in accordance with this invention include chocolate liquor, as well as the final chocolate product including solid chocolate bars, and baking chocolate bars. The so-called "chocolate liquor" may be treated in either the liquid or solid state. As hereinbefore noted, nibs are prepared by breaking open the raw cocoa beans and separating out the undesirable materials including shells. Liquor may be attained from the nibs by roasting the nibs and milling the roasted nibs.

It is a feature of this invention that when the raw material to be treated is chocolate liquid, it will preferably be at temperature of at least 120° F., preferably 120° F.–150° F., say 140° F., and the hot molten liquor may be maintained at this temperature during subsequent treating as hereinafter defined; when this is done, it is found that the ultimate product which is obtained is characterized by greater homogeneity. Since the chocolate liquor is normally produced at about this temperature range, this permits a direct passage of the freshly-prepared chocolate liquor to the ensuing steps.

Decreased bloom together with the other advantages which may be obtained in accordance with this invention may be realized by treating the hereinbefore defined chocolate with ionizing penetrating radiation.

The ionizing penetrating radiation which can be employed to give the desired product of this invention includes beta and gamma rays. Beta rays include cathode rays, the former term being the common designation when the rays originate from a naturally or artificially radioactive source, while the latter designation is commonly employed to indicate rays produced in an electrical apparatus, e.g., of the vacuum tube type. Beta rays and electron beams are particulate in character, while gamma rays and X-rays are electromagnetic.

The term gamma rays, as used herein, is intended to include therewithin X-rays. The term "gamma" is commonly employed when the rays originate from a naturally or artificially radioactive source, while the term "X-ray" is commonly used when the rays are continuously produced by electron bombardment of suitable targets in an appropriate apparatus. Gamma radiation sources include cobalt 60, europium 152, europium 154, cesium 134, barium 137, antimony 124, silver 110, iron 59, tantalum 182, zinc 56, rubidium 86, scandium 46, niobium 95, and zirconium 95. Beta radiation may be administered in a linear accelerator or a Van de Graff-type machine.

The ionizing penetrating radiation which can be used in the process of this invention is that having an energy falling within the range of $10^{-3}$ mev. (million electron volts) up to about 15 mev.; when the preferred type of radiation, i.e., gamma radiation including X-ray radiation, is employed, the energy thereof will typically fall in the range of $10^{-3}$ mev. up to about 2.5 mev. Typically the wave length of the preferred gamma radiation will be within the range of 0.01 up to about 14 Angstrom units; the frequency may range from about $10^{18}$ up to about $10^{21}$ per second.

It has been found that the gamma rays emitted by radioactive atoms, particularly atoms which have been artificially rendered radioactive by bombardment thereof with e.g., neutrons, are particularly suitable for use in connection with this invention. When gamma radiation from such a source is used, the preferred energy ranges of the gamma particles are those falling within the range of $8.8 \times 10^{-3}$ mev. up to 2.5 mev. The wave length of these gamma rays is 0.01 Angstrom unit to about 14 Angstrom units. The frequencies may range from e.g. $0.3 \times 10^{19}$ up to $0.3 \times 10^{21}$ per second.

Cobalt-60 is prepared, e.g., by irradiating normal cobalt of atomic weight 59 in a uranium pile wherein neutrons are present. As a neutron strikes an atom of cobalt-59, it forms the artificially radioactive cobalt-60 which emits gamma radiation having an energy of 1.1 and 1.3 mev. The half-life of cobalt-60 is 5.3 years.

The amount of radiation to which the chocolate products hereinbefore defined may be subjected to attain the desired effects of this invention will preferably be about $1 \times 10^6 - 5 \times 10^6$ rad, preferably $5 \times 10^6$ rad; i.e. 1-5, say 5 megarad. The term "rad" stands for roentgen average dosage. A rad is a measure of the average amount of radiation falling on a particular material, and is measured by determining the effect upon a standard such as the commonly used methylene blue indicator located immediately adjacent to the sample being irradiated. At the conclusion of the radiation experiment, the number of rads supplied to the substance can be determined by comparing the irradiated methylene blue with a standard non-irradiated methylene blue sample.

According to one embodiment of this invention, the irradiated chocolate need not be tempered although if insufficient radiation dosage be employed, some tempering may be required. Tempering may be effected by heating the chocolate (e.g. in the form of liquor) to 130° F. with stirring followed by slow cooling to about 87° F. at which point the material may be held for time sufficient to induce tempering. It may then be, for example, poured into molds to solidify and cooled to 60° F.

It is a feature of this invention, however, that the time of tempering may be considerably decreased or tempering may be eliminated entirely when the chocolate liquors are treated as herein described without sacrifice of any of the desirable properties herein noted. This is particularly important because tempering normally in commercial production is an expensive holding step of substantial magnitude; and a large inventory of chocolate is tied up in the tempering step.

The product which has been so prepared in accordance with this invention may be found to be characterized by increased storage life; a high resistance to bloom; improved melting characteristics; and decreased bacteria count in the finished product.

Although the most readily observable feature of the products of this invention is their freedom from bloom, it is also apparent that there are other physical properties which have been modified and which contribute to the superior character of the product. For example, it may be observed that the novel chocolate product is more flexible, pliable, and plastic than a control prior art chocolate; this may be advantageous when the chocolate liquor is used as a coating for certain materials. More specifically, it is found that the decreased initial melting point and increased melting range of the product treated in accordance with this invention permits attainment of substantial improvements in the coating characteristics of the chocolate. The increased spreadability and lower viscosity at a given temperature may greatly facilitate enrobing operations with no attendant disadvantages. This permits commercial enrobing operations to be conducted much more efficiently in that the desired product can be attained with smaller amounts of chocolate.

The advantages of this invention will be readily apparent on inspection of the following examples, Example I being a control experiment against which subsequent examples are measured.

EXAMPLE I

In accordance with this example, raw cocoa beans were broken up to obtain nibs therefrom and the nibs were separated from the shells and other undesirable material. The nibs were roasted at 284° F. for 20 minutes and then milled to form cocoa liquor. This liquor was tempered by heating to 130° F. and slowly cooled to 87° F. at which temperature it was held for 3 hours. It was then cooled to 60° F. to solidify.

The so-solidified liquor was subjected to the cycling or accelerated test hereinbefore discussed in detail by heating the solidified liquor to 90° F. for 15 hours and then cooling to 60° F. and maintaining at that temperature for the same period of time. Each of these cycles was repeated several times.

The results of the cycling test for this standard control experiment and subsequent examples is tabulated hereinafter in Table I.

EXAMPLE II

In accordance with this example, the procedure of Example I was followed except that the liquor which had been heated to 130° F. was irradiated at that temperature with ionizing penetrating radiation. More specifically, it was subjected to gamma radiation from a cobalt-60 source. Radiation was continued until the dosage, as determined by comparison with control methylene blue indicator as hereinbefore described, was $5 \times 10^6$ rad.

EXAMPLE III

In accordance with this example, the procedure of Example I was followed except that the liquor which had been heated to 140° F. was irradiated with ionizing penetrating radiation. More specifically, it was subjected to beta radiation from a 2 mev. Van de Graff generator for a period of time sufficient to provide a dosage of $5 \times 10^6$ rad.

The solidified irradiated chocolate liquors of Examples I, II, and III were subjected to the cycling test hereinbefore described in detail, and the results are noted in the second column of Table I. Also noted in Table I in the third column are the results of a normal test wherein each of the three solidified liquors was stored at ambient room temperature of 70° F. until it was unsatisfactory as determined by bloom.

Table I

| Example | Bloom after 3 Cycles | Normal Test |
| --- | --- | --- |
| I (Control) | Heavy bloom | Unsatisfactory after 2 months. |
| II | Bloom-free | Perfect after 4 months. |
| III | do | Do. |

In further comparative tests, the technique of Examples I, II, and III was repeated except that the irradiated chocolate was not tempered, before the 3 samples were subjected to the normal test. After 3 weeks, the control of Example I was found to possess a very heavy bloom, whereas the irradiated samples of II and III were found to be 100% satisfactory i.e. free of any trace of bloom. Further storage of the samples of Examples I, II, and III for a total time of four months was carried out, and no bloom was observed on samples II and III while the bloom of sample I was increased considerably.

From these experiments, it is apparent that the products treated in accordance with this invention (whether or not tempering is employed) are eminently superior with respect to shelf life and freedom from bloom.

In another series of 3 tests, 3 samples corresponding to those of Examples I, II, and III (which had been irradiated in solid form) in the form of solid pieces of solidified chocolate liquor in pie-pan-like molds, were maintained for 1 year at room temperature. The control sample corresponding to Example I was found to be fully bloomed, and this bloom was apparent throughout the entire volume of the piece of chocolate. On the other hand, the samples of Examples II and III were found to possess a slight bloom on the face thereof which had been exposed to the atmosphere, but the internal portion of the solidified mass and the bottom surface were found to be free of bloom.

It will be apparent to those skilled-in-the-art that products which have been obtained by the process of this invention are eminently superior in terms of resistance to bloom and that these products may be characterized by a substantially extended storage life even under the most unfavorable cycling conditions. Although this invention has been described with reference to specific examples, it will be understood that various changes and modifications may be made thereto; and that these changes and modifications will fall within the scope of this invention.

What is claimed is:

1. The process which comprises treating chocolate liquor with ionizing penetrating radiation in an amount sufficient to substantially inhibit the formation of bloom in a chocolate product formed from said liquor.

2. The process which comprises treating chocolate liquor with gamma radiation in an amount sufficient to substantially inhibit the formation of bloom in a chocolate product formed from said liquor.

3. The process which comprises treating chocolate liquor with gamma radiation at a dose of 1–5 megarad.

4. The process which comprises treating chocolate liquor with beta radiation in an amount sufficient to substantially inhibit the formation of bloom in a chocolate product formed from said liquor.

5. The process of decreasing bloom in a chocolate product which comprises treating chocolate liquor with beta radiation at a dose of 1–5 megarad.

6. The process which comprises treating chocolate liquor in solid state with ionizing penetrating radiation in an amount sufficient to substantially inhibit the formation of bloom in a chocolate product formed from said liquor.

7. The process which comprises treating chocolate liquor in liquid state with ionizing penetrating radiation in an amount sufficient to substantially inhibit the formation of bloom in a chocolate product formed from said liquor.

8. The process of decreasing bloom in a chocolate product which comprises treating chocolate liquor with ionizing penetrating radiation in an amount sufficient to substantially inhibit the formation of bloom in a chocolate product formed from said liquor and converting said irradiated chocolate liquor into a chocolate product.

9. The process of decreasing bloom in a chocolate product as claimed in claim 8 wherein said chocolate liquor is irradiated while hot.

10. The process of decreasing bloom in a chocolate product as claimed in claim 8 wherein said chocolate liquor is irradiated at 120° F.–150° F.

11. The process of decreasing bloom in a chocolate product as claimed in claim 8 wherein said chocolate liquor is irradiated at a temperature of 140° F.

12. The process of decreasing bloom in a chocolate product which comprises treating chocolate liquor with ionizing penetrating radiation in an amount sufficient to substantially inhibit the formation of bloom in a chocolate product formed from said liquor, tempering said irradiated chocolate liquor, and forming a chocolate product from said tempered irradiated chocolate liquor.

13. The process which comprises subjecting chocolate to ionizing penetrating radiation in an amount sufficient to substantially inhibit the formation of bloom in said chocolate.

14. The product produced in accordance with the practice of the process of claim 13.

References Cited in the file of this patent

UNITED STATES PATENTS

| 2,887,583 | Emanuelson | May 19, 1959 |
| 2,894,846 | Stoddard | July 14, 1959 |

OTHER REFERENCES

"The Chemistry Flavoring and Manufacture of Chocolate Confectionery and Cocoa," by Jensen, J & A. Churchill, 40 Gloucester Place, Portman Square, London, 1931, pages 115 and 150–152.

"The Radiation Preservation of Foods, Nature of the Radiation Process," by Pomerantz, Industrial Refrigeration, November 1956, page 15.